US006730217B2

(12) United States Patent
Schaaf et al.

(10) Patent No.: US 6,730,217 B2
(45) Date of Patent: May 4, 2004

(54) MAGNETIC PARTICLE SEPARATOR AND METHOD

(75) Inventors: William R. Schaaf, Greer, SC (US); Ray R. Arel, Anderson, SC (US)

(73) Assignee: Insul-Magnetics, Inc., Taylors, SC (US)

( * ) Notice: Subject to any disclaimer, the term of this patent is extended or adjusted under 35 U.S.C. 154(b) by 92 days.

(21) Appl. No.: 10/113,658

(22) Filed: Mar. 29, 2002

(65) Prior Publication Data

US 2003/0183580 A1 Oct. 2, 2003

(51) Int. Cl.[7] .................................................. B01D 35/06
(52) U.S. Cl. ........................ 210/222; 210/695; 209/228
(58) Field of Search .................... 95/28; 96/1; 209/228; 210/222, 695

(56) References Cited

U.S. PATENT DOCUMENTS 4,946,589 A * 8/1990 Hayes ........................ 210/222
5,043,063 A * 8/1991 Latimer ...................... 210/222
5,819,949 A * 10/1998 Schaaf et al. ............ 209/223.2
5,871,642 A * 2/1999 Meeks ........................ 210/222

* cited by examiner

*Primary Examiner*—David A. Reifsnyder
(74) *Attorney, Agent, or Firm*—Ralph Bailey

(57) ABSTRACT

A tank [A] has a fluid inlet, a fluid outlet, and a closure [B] wherein the tank may be positioned in line as a pressure vessel. A magnetic core assembly includes elongated permanent magnets [C] and magnet covers or tubes [D] constructed of non-magnetic material for collecting magnetic particles from a liquid. The core assembly is carried in the tank and is removable after the separate closure is removed from the tank. The method contemplates separating the magnets from the tubes for removal of the magnetic particles from the magnetic core assembly externally of the tank and independently of the closure.

11 Claims, 3 Drawing Sheets

MAGNETIC PARTICLE SEPARATOR AND METHOD

BACKGROUND OF THE INVENTION

This invention relates to the apparatus and method for separating magnetic particles from a fluid utilizing a tank having an open top and a cover removable from the tank separately from a permanent a magnetic assembly, thereby permitting the assembly to be taken from the tank along with the magnetic particles collected thereby independently of the cover for removal of the magnetic particles externally of the tank.

The prior art includes U.S. Pat. No. 5,043,063, that illustrates a magnetic trap for removing magnetic particles from a liquid wherein a tank is carried in line utilizing a cover for an open top that has attached thereto a permanent magnet assembly. The assembly, includes a wiper plate carrying spaced depending non-magnetic sleeves for containing the various magnets. This structure is expensive and requires considerable effort for removal from the tank because of combined weight of the magnet assembly and the cover, both of which must be removed at the same time because of their interconnected construction. Not only is the assembly and cover combination complicated and expensive, but also it is heavy and awkward to manipulate, when the two components are attached and must be manipulated at the same time.

The prior art is further exemplified by U.S. Pat. No. 5,819,949, which illustrates a magnetic assembly having removable magnets, which are cammed or wedged into place for positioning with the non-magnetic tubes in assembled relation. Such an assembly is useful when combined with the tank and cover construction of the present invention for removal from the tank after the cover is removed. The prior art further illustrates by U.S. Pat. Nos. 5,427,249, 5,470,466, 6,056,879, and 6,355,176.

SUMMARY OF THE INVENTION

Accordingly, it is an important object of this invention to provide a tank having a removable cover and a support for positioning a magnetic assembly within the tank in such a way that the cover must be removed prior to removal of the magnetic assembly.

Another important object of the invention is to facilitate removal of magnetic particles from a liquid avoiding the use of paper filters, thus minimizing waste and resulting contamination from the particle removal process.

An important object of the invention is the provision of a separable removable cover for a magnetic separator which includes an open tank wherein the tank cover is separate from a magnetic assembly positioned within the tank.

It is also an important object of the invention to provide a simplified construction having minimal weight characteristics wherein the cover may be removed prior to removal of an independently carried magnetic assembly having permanent magnets removably carried within non-magnetic tubes for ease in separating the magnetic particles from the assembly after removal from the tank.

It has been found that by utilizing a tank in line, or otherwise connected to a source of a liquid containing magnetic particles and having an outlet passage, that the tank may be provided with a removable cover preferrably of suitable construction for us in pressure vessels. The tank is constructed so as to position a magnetic core assembly which includes circumferentially spaced magnets with non-metallic sleeves. The magnetic assembly includes a handle for removably positioning the assembly within the tank. A wiper plate is provided for suspension from a ledge carried about the periphery at the open upper of the tank for carrying the magnet and non-magnetic sleeve assemblies.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a magnetic particle separator including an upright cylindrical tank A having a fluid inlet connection and a fluid outlet connection. A removable closure member B is provided for the tank. A magnetic core assembly is receivable within the tank and removable from the tank independently of the closure member for separating magnetic particles from the fluid. The core assembly includes at least one elongated permanent magnet C and a nonmagnetic tube D covering the elongated permanent magnet receiving magnetic particles from the fluid. After removal of the closure member release of the magnetic particles is achieved by separation of the insulation tubes from the elongated permanent magnets.

Figure 2:
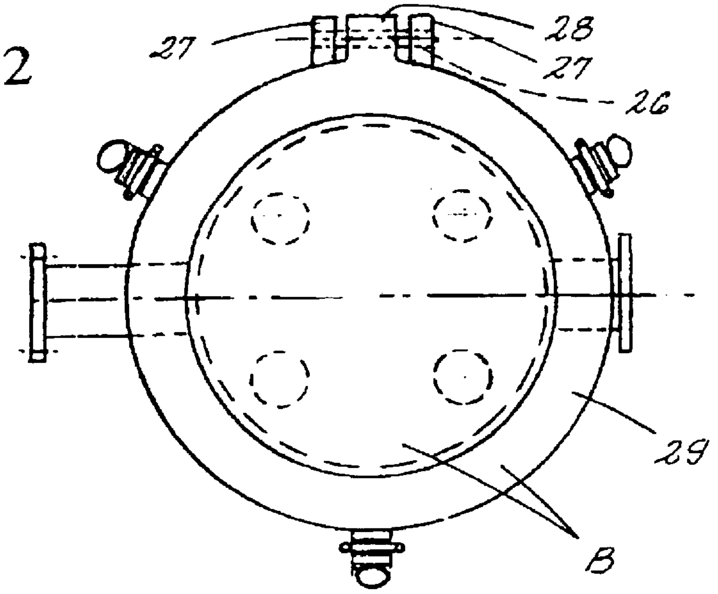
FIG. 2 is a top plan view illustrating the separable cover together with a pivotal attachment to the outer periphery of the tank for removing the cover by pivotal movement allowing the cover hang downwardly at the side to permit removal of the magnetic core assembly.
Figure 1:
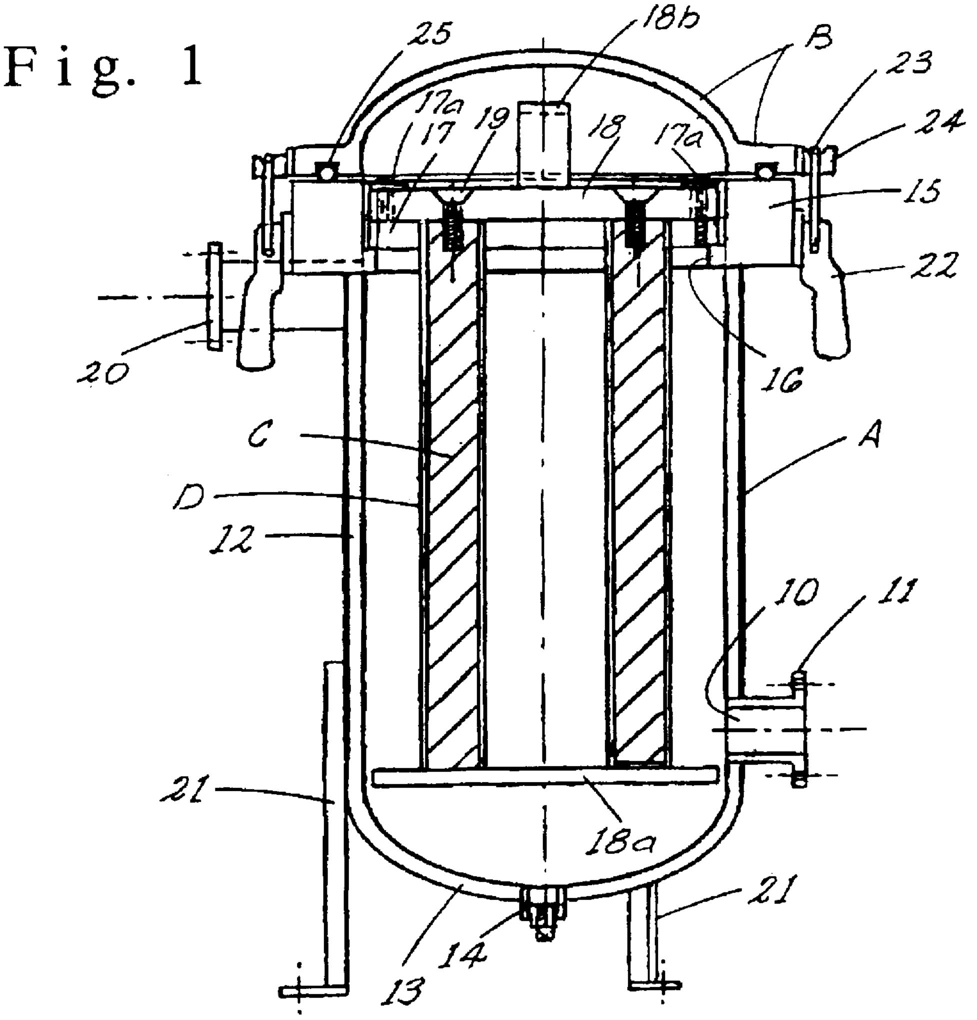
FIG. 1 is a sectional elevation illustrating a magnetic particle separator constructed with accordance of the invention showing a tank cover as being positionable on an open upright tank by manually operated clamps maintaining a magnetic assembly seperably from the cover which is supported in depending relation by a ledge within the tank.

Referring more particularly to FIGS. 1 and 2 the tank A is illustrated as including a port 10 having a flanged connection 11 positioned at a lower end of the tank sides 12. The tank has an an arcuate bottom 13 of a suitable design for use with a pressure vessel having a clean out port assembly 14 at the bottom of the tank.

A rim 15 at an upper open end of the tank defines an internal peripheral flange 16 for supporting in depending relation the magnetic assembly including a wiper member 17 at a lower portion of a plate 18. The wiper member carries circumferentially spaced non-magnetic tubular members D carrying permanent magnets C secured thereto by screws 19. A lower support 18*a* adds rigidity and strength to the magnetic assembly. The assembly is provided with a handle 18 for removal of the magnetic assembly from the tubes. The support plate 18 is fastened by a clamp 17*a* to the wiper member 17. The non-magnetic tubes D are carried by the member 17.

The tank has an outlet port 20 and is preferably supported on spaced legs 21. The manually operated clamps preferably include a handle 22 pivotally carried upon the rim 15 for forcibly fixing a ring 23 upon a projecting member 24 extending outwardly from the dome shaped cover or closure member B. The cover B is provided with a gasket formed from a circular deformable member 25. FIG. 2 further illustrates a pivotal connection for the removal cover B utilizing a horizontal pin 26 positioned between spaced post 27 and passing through an intermediate pivotal portion 28 of the flange 29 forming a marginal portion of the cover B.

Figure 4:
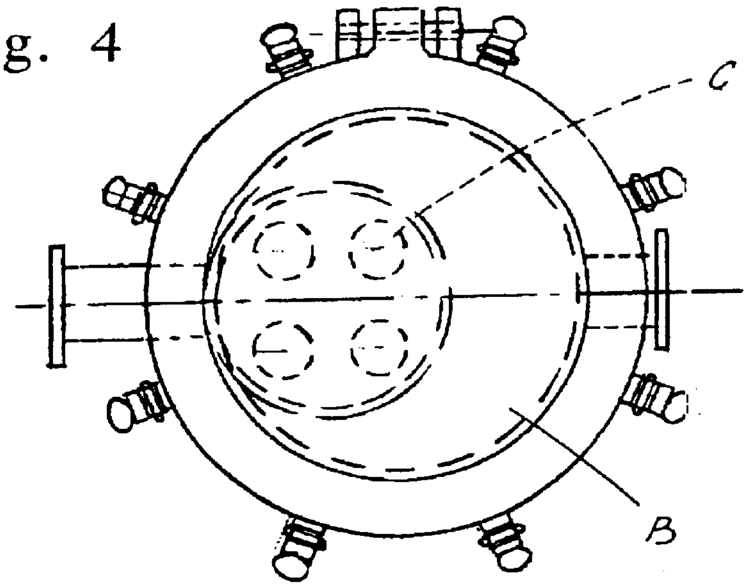
FIG. 4 is a top plan view further illustrating the construction of the pivotal cover with circumferentially spaced clamps carried by the tank with inlet and outlet ports.
Figure 3:
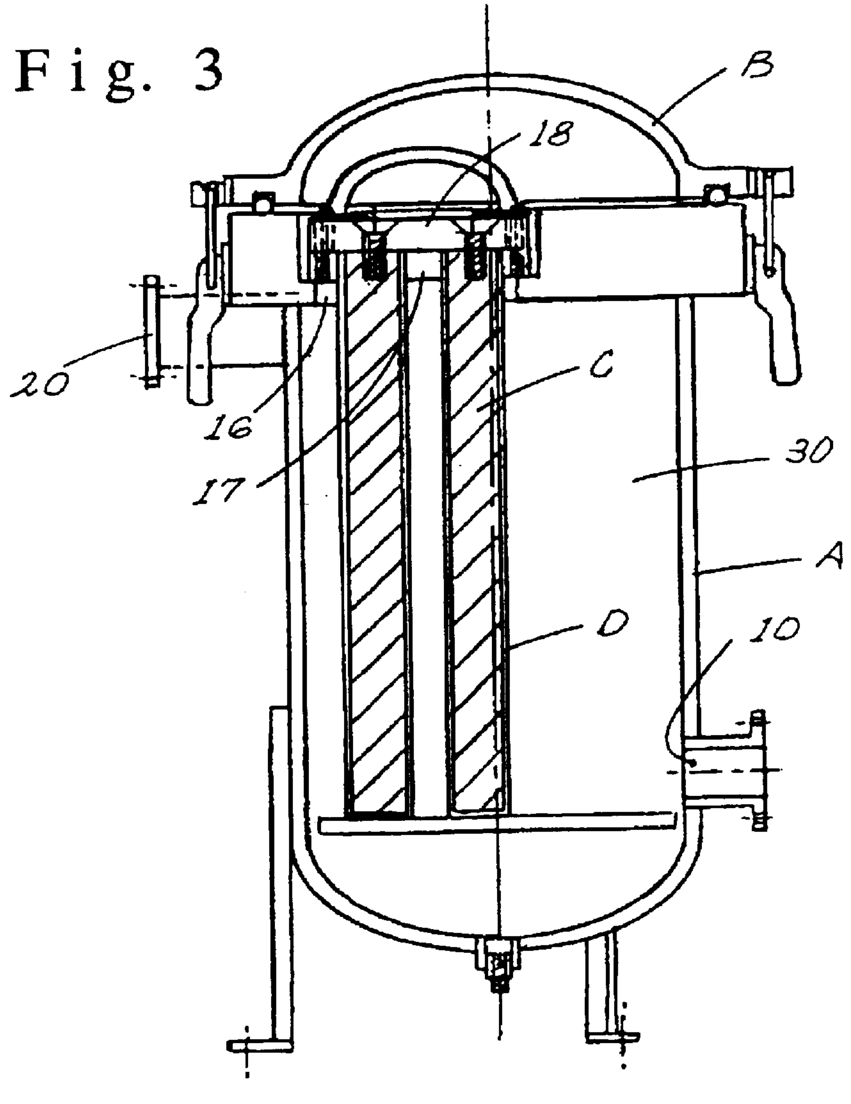
FIG. 3 is a sectional elevation illustrating an alternate form of the invention when the magnetic assembly is asymetrically arranged within the tank and wherein the cover is pivotally maneuvered by releasing spaced clamps for removal from the tank to permit subsequent removal of a magnetic particle removing assembly carried within the tank.
Figure 5:
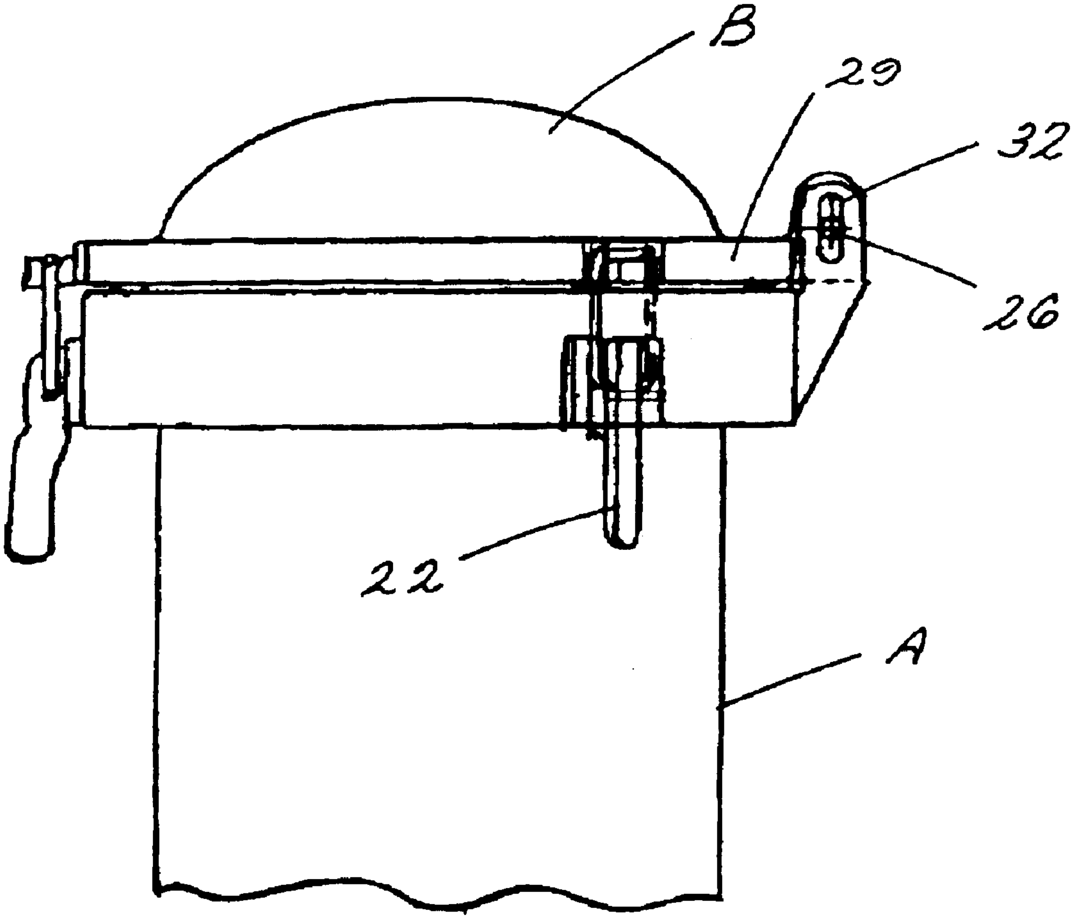
FIG. 5 is an elevation looking toward the tank from the right hand side of FIG. 3 further illustrating the pivoted cover and manually operated clamping apparatus.

An alternate form of the invention is illustrated in FIGS. 3, 4, and 5, for in line use of the separator apparatus. In addition to the features described above, a magnetic assembly is positioned upon the disc 18 and the wiper member 17. The magnetic assembly is secured in a depending position and supported by the ledge 16 as illustrated in FIGS. 3 and 4 and being asymmetrically arranged within the tank. This arrangement provides an enlarged volume 30, as best shown in FIG. 3, within the tank for receiving fluid from the inlet 10. Thus the flow of liquid may be slowed permitting contact with the magnetic assembly over a longer period before passing from the tank through the outlet 20.

FIG. 5 illustrates a clamp having a pivotal clamping member 22 for securing the cover B. The flange 29 of the cover has a projection carrying a vertically slot 32 permitting the pin 26 to move up and down to accommodate the action of the clamps.

While a preferred embodiment for the invention is for illustrative purposes only, and it is to be understood that changes and variations may be made in tank and cover construction, as well as in the construction of the assembly of the permanent magnets and their non-magnetic covers without departing from the spirit or scope of the following claims.

What is claimed is:

1. A magnetic particle separator for separating magnetic particles from a fluid comprising:

a tank having a fluid inlet connection and a fluid outlet connection;

a removable closure member for the tank;

a magnetic core assembly receivable within the tank and removable from the tank independently of the closure member for separating magnetic particles from the fluid, the magnetic core assembly including:

at least one elongated permanent magnet; and an insulation tube covering the at least one elongated permanent magnet receiving magnetic particles from the fluid, whereby the magnetic core assembly is removable from the tank after separation of the magnetic particles from the fluid and after removal of the closure member permitting release of the magnetic particles upon separation of the insulation tube from the elongated permanent magnet externally of the tank.

2. The magnetic particle separator set forth in claim 1, wherein the removable closure member has a pivotal connection adjacent to an open upper edge of the tank.

3. The magnetic particle separator set forth in claim 2 wherein spaced manually operated clamps are carried adjacent the periphery of the tank and are fastenable to the removable closure member.

4. The magnetic particle separator set forth in claim 3 having a fluid inlet adjacent to a bottom of the tank and a fluid outlet adjacent to an upper edge of the tank.

5. The magnetic particle separator set forth in claim 1 wherein an upright tank vertically receives an upright magnetic core assembly having a removable member carrying a plurality of circumferentially spaced depending magnets and wherein upper and lower supports carry correspondingly spaced tubes constructed of non-magnetic material therebetween and being open at the top for receiving respective magnets.

6. The magnetic particle separator set forth in claim 5 wherein a ledge is carried within the tank for supporting the upright magnetic core assembly suspended therefrom.

7. The magnetic particle separator set forth in claim 6 wherein the upright magnetic core assembly is supported asymmetrically in the tank.

8. A magnetic particle separator for separating magnetic particles from a fluid comprising:

an upright cylindrical tank having a fluid inlet connection and a fluid outlet connection;

a removable closure member is positioned over an open upper end of the tank;

an upright magnetic core assembly receivable within the tank and removable from the tank independently of the closure member for separating magnetic particles from the fluids;

the core assembly including a plurality of spaced elongated permanent magnets; and insulation tubes covering the respective elongated permanent magnets for collecting magnetic particles from the fluid;

whereby the magnetic core assembly is removable from the tank after separation of the magnetic particles from the fluid and after removal of the closure member permitting release of the magnetic particles upon separation of the elongated permanent magnets from the insulation tubes.

9. A method of separating magnetic particles from a fluid comprising the steps of:

positioning a tank having a fluid inlet connection and a fluid outlet connection in an upright position;

securing a removable closure member about an open top of the tank;

positioning an upright magnetic core assembly within the tank for removal from the tank independently of the closure member after separating magnetic particles from the fluid;

attaching magnetic particles in the fluid to the magnetic core assembly for separation from the fluid;

removing the closure member from the tank;

removing the magnetic core assembly from the tank; and then removing the magnetic particles from the core assembly;

whereby the magnetic core assembly is removable from the tank after separation of the magnetic particles from the fluid and after removal of the closure member permitting release of the magnetic particles externally of the tank.

10. The method set forth in claim 9 including the steps of positioning a plurality of circumferentially magnets within the magnetic core assembly, and suspending the magnetic core assembly about a ledge at an inner periphery of the tank.

11. The method set forth in claim 10 including the steps of covering the magnets of the magnetic core assembly with insulation tubes prior to positioning the magnetic core within the tank for collecting the magnetic particles thereto; and removing the magnets from the insulation tubes after the magnetic core assembly has been removed from the tank for releasing the magnetic particles for disposal thereof.

* * * * *